(12) United States Patent
Agiwal et al.

(10) Patent No.: US 9,094,861 B2
(45) Date of Patent: Jul. 28, 2015

(54) METHOD AND SYSTEM FOR GENERATING AND PROCESSING MEDIUM ACCESS CONTROL PACKET DATA UNITS IN A BROADBAND WIRELESS NETWORK ENVIRONMENT

(75) Inventors: Anil Agiwal, Bangalore (IN); Young-Bin Chang, Anyang-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 170 days.

(21) Appl. No.: 13/565,433

(22) Filed: Aug. 2, 2012

(65) Prior Publication Data

US 2014/0036766 A1 Feb. 6, 2014

(51) Int. Cl.
*H04W 4/00* (2009.01)
*H04W 28/06* (2009.01)
*H04W 80/02* (2009.01)

(52) U.S. Cl.
CPC .............. *H04W 28/06* (2013.01); *H04W 80/02* (2013.01)

(58) Field of Classification Search
CPC ..... H04W 80/04; H04W 84/12; H04W 88/06; H04W 88/08; H04W 84/18
USPC ........................ 370/328, 315, 395.1, 252, 255
See application file for complete search history.

(56) References Cited

U.S. PATENT DOCUMENTS

| | | | |
|---|---|---|---|
| 2011/0116394 A1* | 5/2011 | Stanwood et al. | 370/252 |
| 2012/0087309 A1* | 4/2012 | Charpentier et al. | 370/328 |

* cited by examiner

*Primary Examiner* — Andrew Lai
*Assistant Examiner* — Jamaal Henson

(57) ABSTRACT

The present invention provides a method and system for generating and processing medium access control (MAC) protocol data units (PDUs) in a broadband wireless network environment. In one embodiment, a method includes determining whether a MAC service data units (SDUs) intended for a receiving device includes fragmented MAC SDU(s). The method also includes generating MAC PDU(s) from the fragmented MAC SDU(s) when the MAC SDUs includes fragmented MAC SDU(s), where each MAC PDU includes a single fragmented MAC SDU. The method further includes determining whether unfragmented MAC SDU(s) in the MAC SDUs satisfy pre-defined criteria. If the unfragmented MAC SDU(s) satisfy the predefined criteria, the method includes generating MAC PDU(s) from the unfragmented MAC SDU(s), where each MAC PDU includes multiple unfragmented MAC SDUs. Otherwise, the method includes generating MAC PDU(s) from the unfragmented MAC SDU(s), where each MAC PDU includes a single unfragmented MAC SDU.

29 Claims, 15 Drawing Sheets

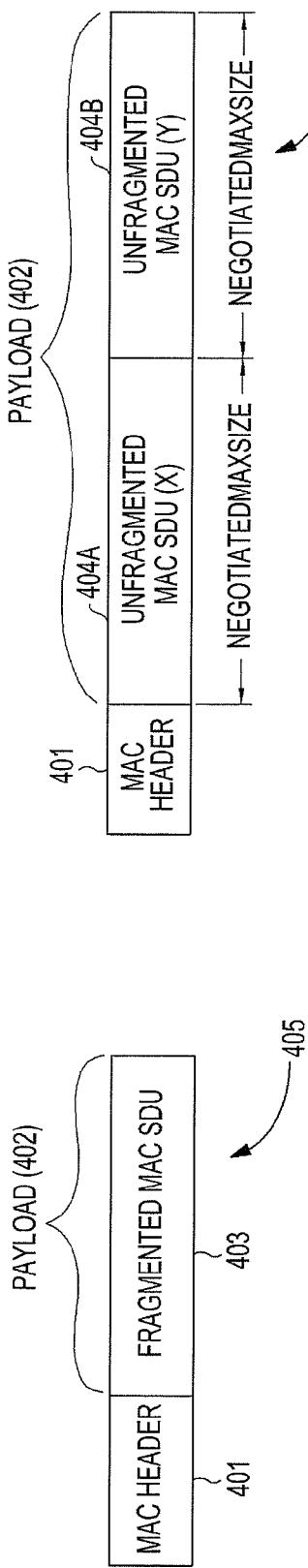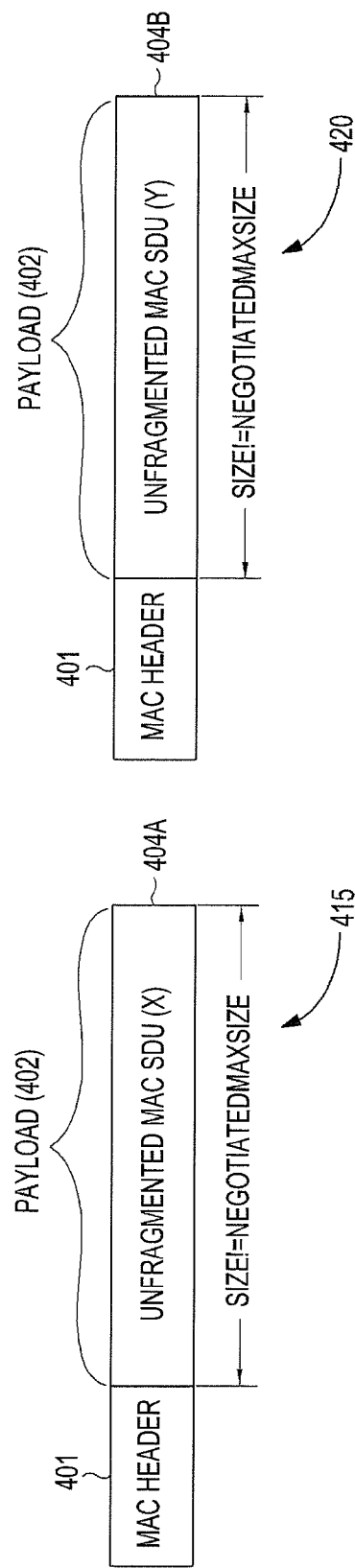

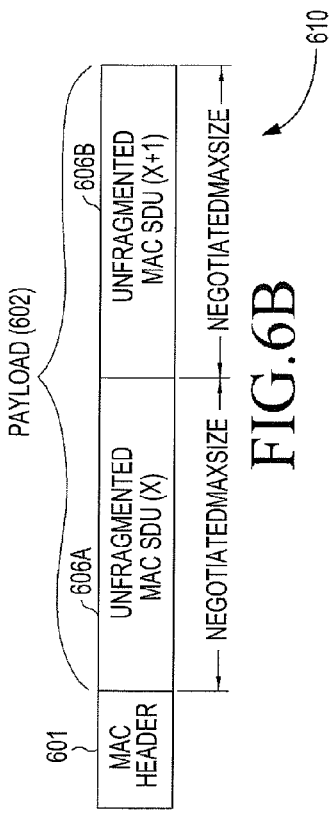
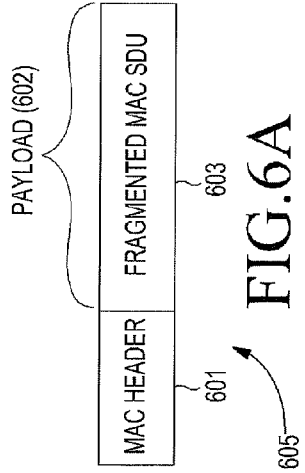
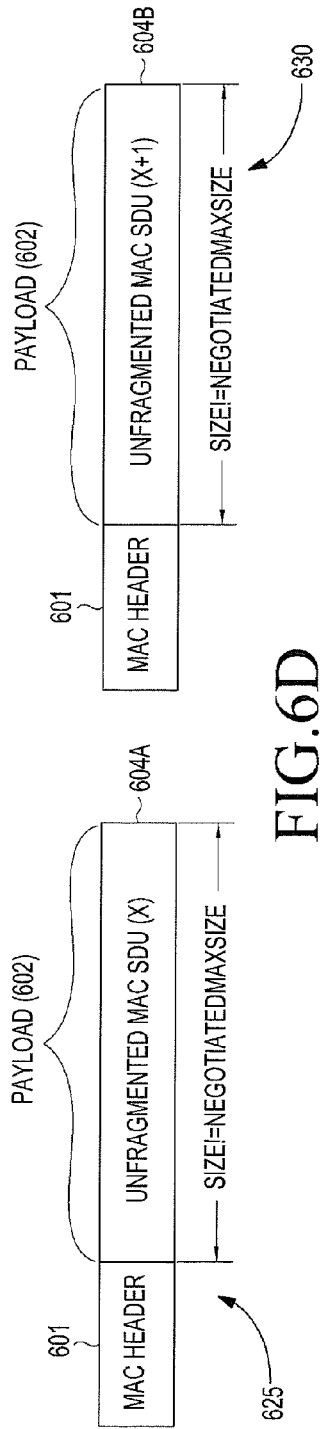
FIG.6A
FIG.6B
FIG.6C
FIG.6D

METHOD AND SYSTEM FOR GENERATING AND PROCESSING MEDIUM ACCESS CONTROL PACKET DATA UNITS IN A BROADBAND WIRELESS NETWORK ENVIRONMENT

FIELD OF THE INVENTION

The present invention generally relates to the field of wireless communication, and more particularly relates to generating and processing medium access control (MAC) packet data units (PDUs) in a broadband wireless network environment.

BACKGROUND OF THE INVENTION

Broadband wireless networks based on various standards (e.g. Institute of Electronic and Electric Engineers (IEEE) 802.16 based WiMAX standard and its evolution to IEEE 802.16m provides various types of services such as voice, packet data and so on. In order to provide these kinds of services, control information and data packets needs to be exchanged between a transmitting device and a receiving device. In downlink scenario, the transmitting device may include a base station and the receiving device may include a mobile station. In uplink scenario, the transmitting device may include a mobile station and the receiving device may include a base station.

Typically, service data is generated by various applications running at the transmitting device for providing various types of services. The service data is then exchanged between the transmitting device and the receiving device upon establishing a connection. Generally, the connection is identified by a connection identifier.

Multiple connections may exist between the transmitting device and the receiving device to carry service user data belonging to multiple applications running at the transmitting device and the receiving device. On the contrary, a single connection may also be used to carry the service user data belonging to multiple applications running at the transmitting device and the receiving device. Each connection carries variable size MAC Service Data Units (SDUs) received from various applications and contains service user data.

Typically, the transmitting device generates MAC PDUs from MAC SDUs and transmits the MAC PDUs in physical burst to the receiving device over a wireless network. A MAC PDU generally consists of a MAC header and a payload. It is understood that, other headers or sub-headers may be present between the MAC header and the payload. If there are multiple MAC SDUs intended for the receiving device, the transmitting device packs multiple MAC SDUs of varying size in a payload of a MAC PDU. In existing technique, the transmitting device also packs fragmented MAC SDUs and unfragmented MAC SDUs of variable size in the same MAC PDU. Therefore, the transmitting device needs to include a variable size header in the MAC PDU so that the receiving device identifies number of MAC SDUs, length of each MAC SDU and status (i.e. whether the MAC SDU is fragmented or not) of each MAC SDU in the payload. Consequently, there is significant increase in processing time at the transmitting device for generating the MAC PDU and at the receiving device for processing the MAC PDU.

Moreover, upon receiving the MAC PDU, the receiving device has to perform dual reassembly functions in case Automatic Repeat Request (ARQ) connection is enabled. The first reassembly function reassembles the fragmented ARQ blocks. The ARQ block consists of unfragmented MAC SDU(s) and/or fragmented MAC SDUs. The second reassembly function reassembles the fragmented MAC SDUs received in the ARQ block. This may result in increased processing time at the receiving device.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4A-4C illustrate a schematic representation of exemplary MAC PDUs, according to one embodiment;

FIGS. 6A-6D illustrate a schematic representation of exemplary MAC PDUs, according to another embodiment;

The drawings described herein are for illustration purposes only and are not intended to limit the scope of the present disclosure in any way.

DETAILED DESCRIPTION OF THE INVENTION

The present invention provides a method and system for generating a medium access control (MAC) protocol data unit (PDU) in a broadband wireless network environment. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
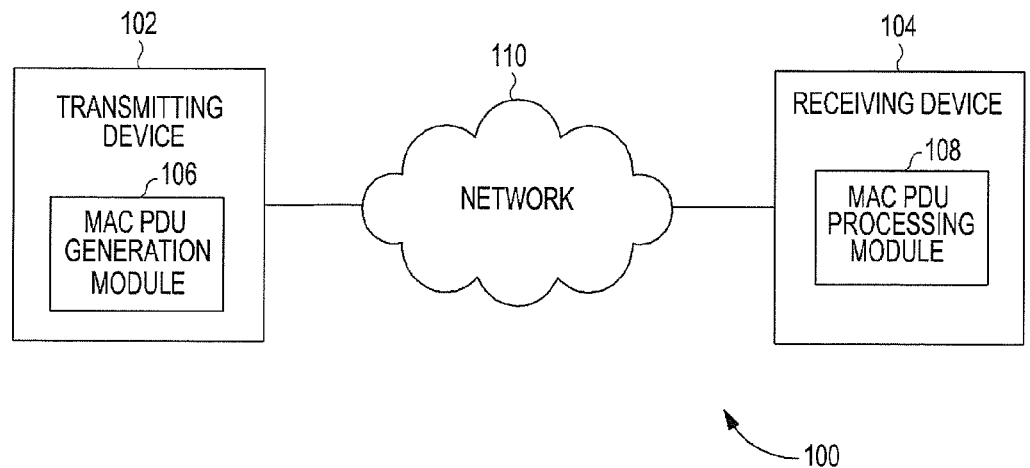
FIG. 1 is a block diagram of a wireless network system, according to one embodiment.

FIG. 1 is a block diagram of a wireless network system 100, according to one embodiment. In FIG. 1, the system 100 includes a transmitting device 102, a receiving device 104, and a wireless network 110. The transmitting device 102 is connected to the receiving device 104 via the wireless network 110. The transmitting device 102 may be a mobile station or a base station depending on the functionality. Similarly, the receiving device 104 may be a base station or a mobile station.

According to the present invention, the transmitting device 102 includes a MAC PDU generation module 106 for generating MAC PDUs containing fragmented/unfragmented MAC SDUs intended for the receiving device 104. For example, the MAC PDU generation module 106 generates MAC PDUs from a plurality of variable size MAC SDUs received from upper protocol layers for transmitting on a MAC connection.

In one embodiment, the MAC PDU generation module 106 is configured for packing only one MAC SDU in payload of a MAC PDU when the MAC SDU is a fragmented MAC SDU. In another embodiment, the MAC PDU generation module 106 is configured for packing multiple unfragmented MAC SDUs in payload of a MAC PDU whose size is equal to negotiated maximum size. A negotiated maximum size is a maximum size of MAC SDU that a MAC layer can receive from an upper protocol for transmitting the MAC SDU on a MAC layer connection. The process of determining negotiated maximum size will be explained in greater detail in the description of FIGS. 2A and 2B.

In yet another embodiment, the MAC PDU generation module 106 is configured for packing multiple unfragmented MAC SDUs in the payload of the MAC PDU which are in sequence and also having size equal to negotiated maximum size. In further another embodiment, the MAC PDU generation module 106 is configured for packing single unfragmented MAC SDU in payload of a MAC PDU when the size of the unfragmented MAC SDU is not equal to the negotiated maximum size. In an exemplary implementation, the MAC PDU generation module 106 provides the information associated with fragmented/unfragmented MAC SDU(s) packed in payload of a MAC PDU in a MAC header. This helps the receiving device 104 to easily process MAC PDUs received from the transmitting device 102.

The receiving device 104 includes a MAC PDU processing module 108 for processing the MAC PDU received from the transmitting device 102 over the wireless network 110. The MAC PDU processing module 108 determines whether the payload contains one fragmented/unfragmented MAC SDU or multiple unfragmented MAC SDUs based on the information provided in the MAC header of the MAC PDU. Accordingly, the MAC PDU processing module 108 unpacks the one fragmented/unfragmented MAC SDU or multiple unfragmented MAC SDUs from the payload of the MAC PDU.

The above described and other embodiments are now explained in greater detail with respect to FIGS. 2A through 14 in the description that follows.

Typically, variable sized MAC SDUs are received by MAC layer from upper protocol layers for transmitting on a MAC layer connection. In one embodiment, maximum size of a MAC SDU that the MAC layer can receive from upper protocol layers for transmission on the MAC layer connection is preset by a network entity (e.g., base station). In another embodiment, maximum size of a MAC SDU that the MAC layer can receive from upper protocol layers for transmission on the MAC layer connection is negotiated between a mobile station and a base station. The maximum size of MAC SDU is herein referred to as negotiated maximum size. The negotiated maximum size depends on size of application and its throughput requirements, Maximum Transmission Unit (MTU) of the network 110, whether security is applied by the MAC layer on the MAC layer connection, whether security algorithm is independently applied on each MAC SDU or each payload containing one or more MAC SDUs and/or other fixed information added to MAC SDUs for generating MAC PDU(s).

Figure 2A:
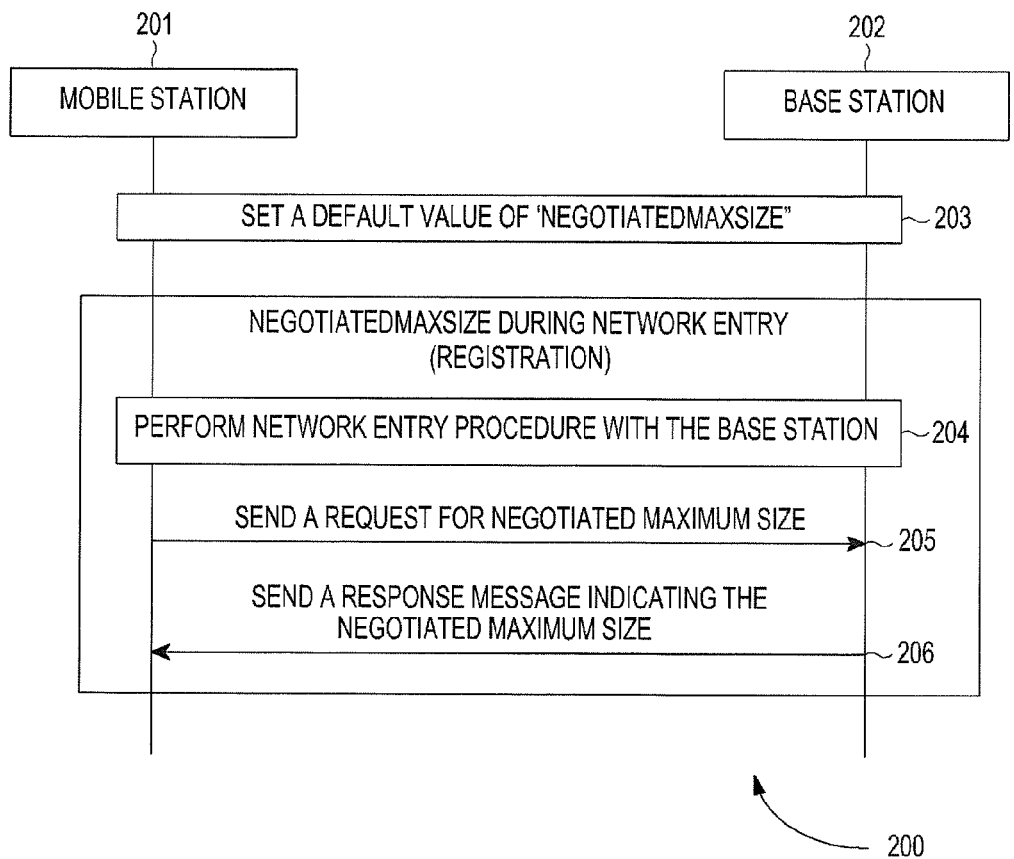
FIG. 2A is a flow diagram illustrating an exemplary method of determining a negotiated maximum size of Medium Access Control (MAC) Protocol Data Units (PDUs) to be transmitted on a MAC layer connection, according, to one embodiment.

FIG. 2A is a flow diagram 200 illustrating an exemplary method of determining a negotiated maximum size of MAC PDUs to be transmitted on a MAC layer connection, according to one embodiment. At step 203, a default value of negotiated maximum size is preset for all MAC connections. Consider that, a mobile station 201 performs network entry procedure with a base station 202 (step 204). At step 205, the mobile station 201 sends a request for the negotiated maximum size to the base station 202. Accordingly, at step 206, the base station 202 sends a response message indicating default negotiated maximum size to the mobile station 201. It can be noted that, the negotiated maximum size can be changed when the mobile station 201 registers with the base station 202. It is appreciated that, the mobile station 201 and the base station 202 are exemplary embodiments of the transmitting device 102 and the receiving device 104 of FIG. 1.

Figure 2B:
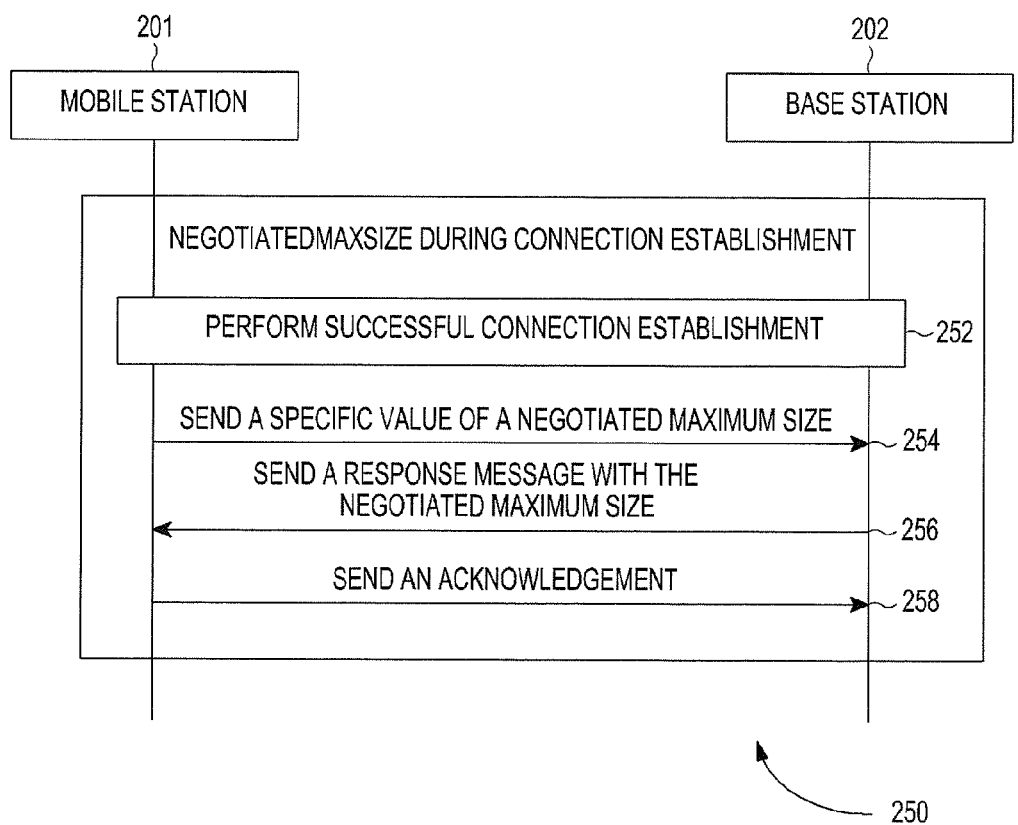
FIG. 2B is a flow diagram illustrating an exemplary method of determining a negotiated maximum size of MAC PDUs to be transmitted on a MAC layer connection, according to another embodiment.

FIG. 2B is a flow diagram 252 illustrating an exemplary method of determining a negotiated maximum size of MAC PDUs to be transmitted on a MAC layer connection, according to another embodiment. Consider that, the mobile station 201 performs successful connection establishment with the base station 202 (step 252). At step 254, the mobile station 201 sends a request including a specific value of negotiated maximum size for a particular MAC connection to the base station 202. Alternatively, the mobile station 201 may not send a specific value of maximum size for a particular MAC connection to the base station 202. At step 256, the base station 202 sends a response message indicating value of negotiated maximum size computed based on the specific value to the mobile station 201. At step 258, the mobile station 201 sends an acknowledgement message indicating successful receipt of the negotiation maximum size. It can be noted that, the value of negotiated maximum size can be changed any time after connection is established in the manner described in steps 254 through 258. For example, in-band or out-band signalling methods may be used to change the value of negotiated maximum size for a particular MAC connection. One skilled in the art will understand that, negotiated maximum size is negotiated for all applications irrespective whether the applications generate fixed size MAC SDUs or variable size MAC SDUs.

In accordance with the present invention, size of a MAC SDU that the upper protocol layer send to the MAC layer is less than or equal to (negotiated maximum size−size of security headers and trailers). This is applicable when security function is enabled for a MAC layer connection, the MAC layer secures MAC SDU by applying security algorithms for each MAC SDU independently, and the negotiated maximum size is the size of the secured MAC SDU. Alternatively, size of a MAC SDU that the upper protocol layer send to the MAC layer is less than or equal to the negotiated maximum size when security function is enabled for a MAC layer connection, the MAC layer secures MAC SDU by applying security algorithms for each MAC SDU independently, and the negotiated maximum size is the size of unsecured MAC SDU.

Similarly, when security function is enabled for a MAC layer connection and the MAC layer secures MAC SDU by applying security algorithms for each MAC PDU, size of a MAC SDU that the upper protocol layer send to the MAC layer is less than or equal to the negotiated maximum size. Further, when security function is not enabled for a MAC layer connection, size of a MAC SDU that the upper protocol layer send to the MAC layer is less than or equal to the negotiated maximum size.

Figure 3:
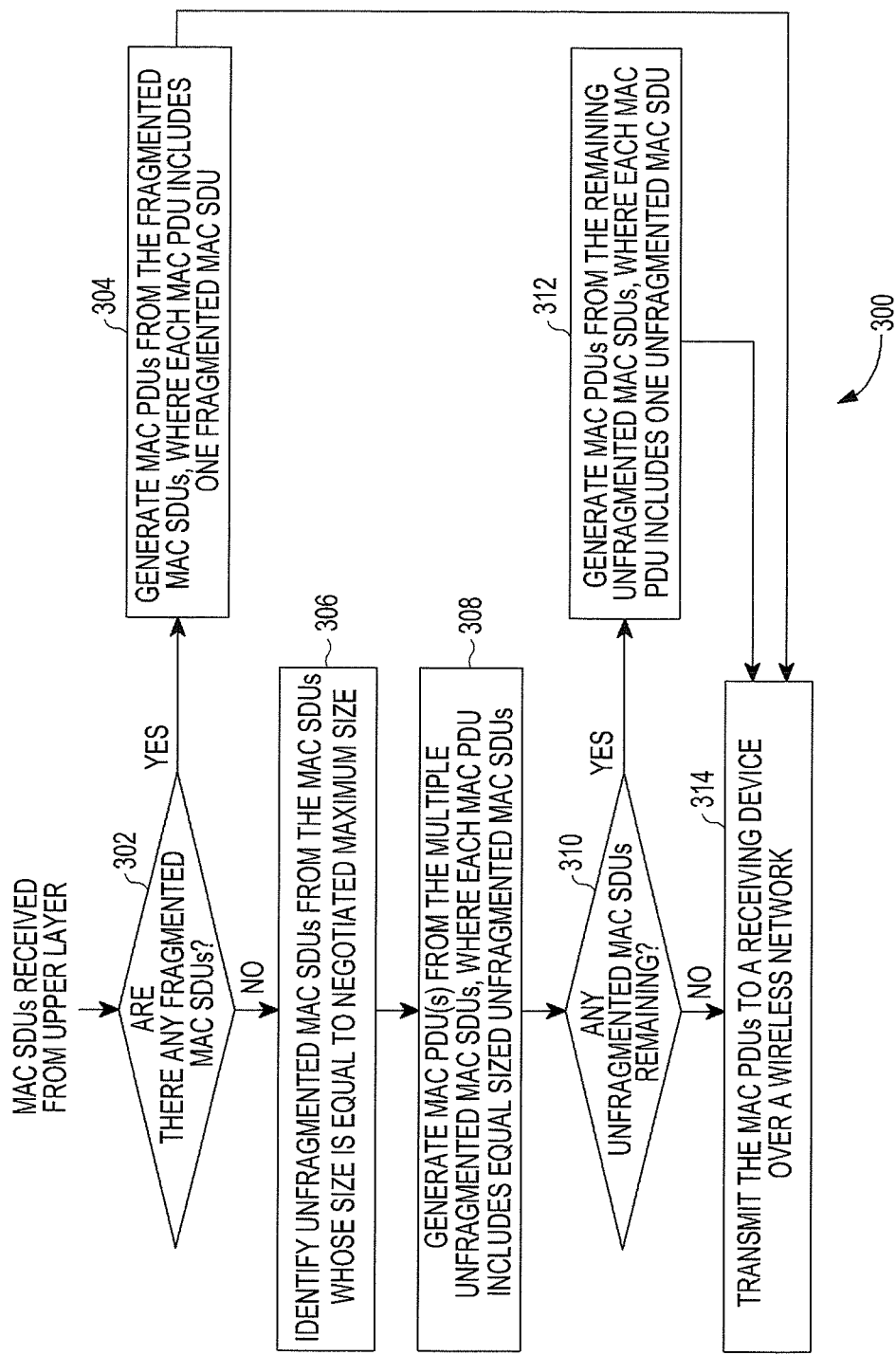
FIG. 3 is a process flowchart of an exemplary method of generating MAC PDU(s) from fragmented/unfragmented MAC Service Data Units (SDUs), according to one embodiment.

FIG. 3 is a process flowchart 300 of an exemplary method of generating MAC PDU(s) from fragmented/unfragmented MAC SDUs, according to one embodiment. At step 302, it is determined whether there exist any fragmented MAC SDUs corresponding to the MAC SDUs received from the upper protocol layer In the transmitting device 102, the MAC layer may fragment the MAC SDUs received from the upper protocol layer (e.g., due to bandwidth issue). Thus, at step 302, the MAC PDU generation module 106 determines whether any of MAC SDUs are fragmented by the MAC layer. If there exists fragmented MAC SDU(s), then at step 304, MAC PDU(s) is generated from the fragmented MAC SDU(s) by packing a single fragmented MAC SDU in a payload of each MAC PDU. In other words, if there is more than one fragmented MAC SDU, then multiple MAC PDUs are generated, where each MAC PDU includes one fragmented MAC SDU. At step 314, the MAC PDU(s) is transmitted to the receiving device 104 over the wireless network 110.

If the fragmented MAC SDUs does not exist, then at step 306, unfragmented MAC SDUs having size equal to the negotiated maximum size are identified from the variable size MAC SDUs. In case of secured connection in which security is applied for each MAC SDU and negotiated maximum size is the maximum size of secured unfragmented MAC SDU, secured unfragmented MAC SDUs having size equal to the negotiated maximum size are identified from the variable size MAC SDUs. At step 308, a MAC PDU(s) is generated from the identified unfragmented MAC SDUs by packing the identified unfragmented MAC SDUs in the payload of the MAC PDU and step 314 is performed.

At step 310, it is determined whether any unfragmented MAC SDUs are remaining in the MAC SDUs. If the unfragmented MAC SDUs are remaining in the MAC SDUs, then at step 312, MAC PDU(s) is generated from the unfragmented MAC SDU(s) by packing a single unfragmented MAC SDU in payload of each MAC PDU. If there is more than one unfragmented MAC SDU, then multiple MAC PDUs are generated from the unfragmented MAC SDUs, where each MAC PDU includes one unfragmented MAC SDU. Thus, when the size of unfragmented MAC SDUs is not equal to the negotiated maximum size, each unfragmented MAC SDU is packed in a payload of a separate MAC PDU. At step 314, the MAC PDU(s) is transmitted to the receiving device 104 over the wireless network 110. If there are no unfragmented MAC SDUs remaining in the MAC SDUs, then step 314 is performed.

FIGS. 4A-4C illustrate a schematic representation of exemplary MAC PDUs, according to one embodiment. Referring to FIGS. 4A-4C, MAC PDUs 405, 410, 415 and 420 include a MAC header 401 and a payload 402.

It can be seen from FIG. 4A that, a single fragmented MAC SDU 403 is packed in the payload 402. As shown in FIG. 4B, two unfragmented MAC SDUs 404A and 404B are packed in the payload 402 of the MAC PDU 410 since the unfragmented MAC SDUs 404A and 404B are of size equal to the negotiated maximum size. Similarly, in case of secured connection where security is applied for each MAC SDU and negotiated maximum size is maximum size of secured unfragmented MAC SDU, two secured unfragmented MAC SDUs 404A and 404B are packed in the payload 402 of the MAC PDU 410 since the secured unfragmented MAC SDUs 404A and 404B are of size equal to the negotiated maximum size.

In FIG. 4C, the unfragmented MAC SDUs 404A and 404B are packed separately in the payload 402 of the MAC PDUs 415 and 420 respectively since the size of the unfragmented MAC SDUs 404A and 404B is not equal to the negotiated maximum size. Similarly, in case of secured connection where security is applied for each MAC SDU and negotiated maximum size is maximum size of secured unfragmented MAC SDU, the secured unfragmented MAC SDUs 404A and 404B are packed separately in the payload 402 of the MAC PDUs 415 and 420 respectively since the size of the secured unfragmented MAC SDUs 404A and 404B is not equal to the negotiated maximum size.

Figure 5:
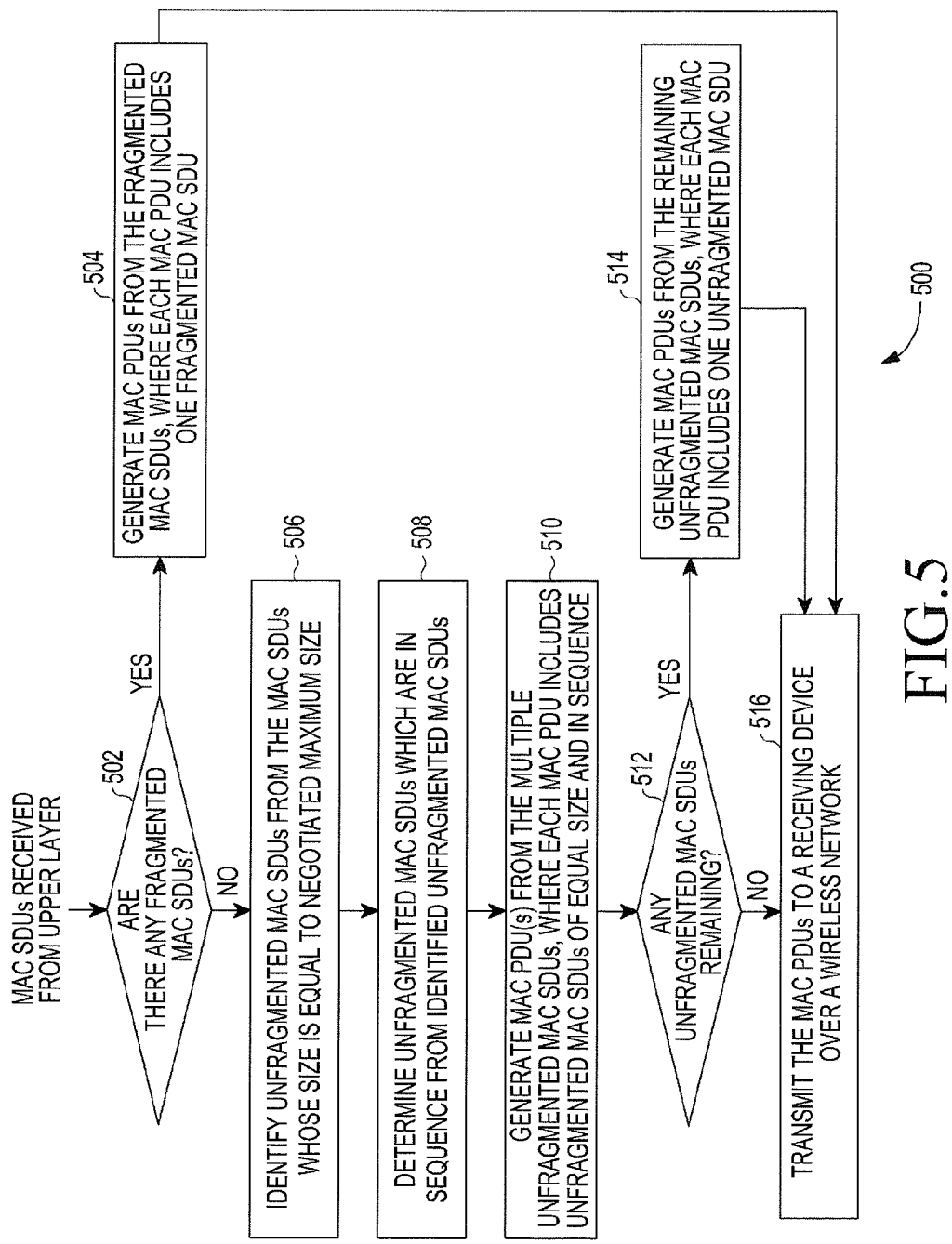
FIG. 5 is a process flowchart of an exemplary method of generating MAC PDU(s) from fragmented/unfragmented MAC SDUs, according to another embodiment.

FIG. 5 is a process flowchart 500 of an exemplary method of generating MAC PDU(s) from fragmented/unfragmented MAC SDUs, according to another embodiment. At step 502, it is determined whether there exists fragmented MAC SDUs corresponding to the MAC SDU(s) received from the upper layer. In the transmitting device 102, the MAC layer may fragment the MAC SDUs received from the upper protocol layer (e.g., due to bandwidth issue). Thus, at step 502, the MAC PDU generation module 106 determines whether any of MAC SDUs are fragmented by the MAC layer. If the fragmented MAC SDU(s) exists, then at step 504, MAC PDU(s) is generated from the fragmented MAC SDU(s) by packing a single fragmented MAC SDU in a payload of each MAC PDU. If there is more than one fragmented MAC SDU, then multiple MAC PDUs are generated, where each MAC PDU includes one fragmented MAC SDU. At step 516, the MAC PDU(s) is transmitted to the receiving device 104 over the wireless network 110.

If the fragmented MAC SDUs does not exists, then at step 506, unfragmented MAC SDUs having size equal to the negotiated maximum size are identified from the MAC SDUs. Similarly, in case of secured connection wherein security is applied for each MAC SDU and negotiated maximum size is the maximum size of secured unfragmented MAC SDU, secured unfragmented MAC SDUs having size equal to the negotiated maximum size are identified from the variable size MAC SDUs. At step 508, unfragmented MAC SDUs which are in sequence are determined from the identified unfragmented MAC SDUs. It is understood that, the step 508 is performed when in sequence delivery is required at the receiving device 104. At step 510, a MAC PDU(s) is generated from the unfragmented MAC SDUs which are in sequence by packing the unfragmented MAC SDUs in the payload of the MAC PDU and step 516 is performed.

At step 512, it is determined whether any unfragmented MAC SDUs are remaining in the MAC SDUs. If the unfragmented MAC SDUs are remaining in the MAC SDUs, then at step 514, MAC PDU(s) is generated from the unfragmented MAC SDU(s) by packing a single unfragmented MAC SDU in a payload of each MAC PDU. If there is more than one unfragmented MAC SDU, then multiple MAC PDUs are generated from the unfragmented MAC SDUs, where each MAC PDU includes one unfragmented MAC SDU. Thus, when the size of unfragmented MAC SDUs is not equal to the negotiated maximum size, each unfragmented MAC SDU is packed in a payload of a separate MAC PDU. At step 516, the MAC PDU(s) is transmitted to the receiving device 104 over the wireless network 110. If there are no unfragmented MAC SDUs remaining in the MAC SDUs, then step 516 is performed.

FIGS. 6A-6D illustrate a schematic representation of exemplary MAC PDUs, according to another embodiment. Referring to FIGS. 6A-6D, MAC PDUs 605, 610, 615, 620, 625 and 630 include a MAC header 601 and a payload 602.

It can be seen from FIG. 6A that, a single fragmented MAC SDU 603 is packed in the payload 602. As shown in FIG. 6B, two unfragmented MAC SDUs 604A and 604B are packed in the payload 602 of the MAC PDU 610 since the unfragmented MAC SDUs 604A and 604B are of size equal to the negotiated maximum size and in sequence. Similarly, in case of secured connection where security is applied for each MAC SDU and negotiated maximum size is maximum size of secured unfragmented MAC SDU, two secured unfragmented MAC SDUs 604A and 604B are packed in the payload 602 of the MAC PDU 610 since the secured unfragmented MAC SDUs 604A and 604B are of size equal to the negotiated maximum size and in sequence.

In FIG. 6C, the unfragmented MAC SDUs 604A and 604B are packed separately in the payload 602 of the MAC PDUs 615 and 620 respectively since the unfragmented MAC SDUs 604A and 604B are not in sequence although the size of unfragmented MAC SDUs 604A and 604B is equal to the negotiated maximum size. Similarly, in case of secured connection where security is applied for each MAC SDU and negotiated maximum size is the maximum size of secured unfragmented MAC SDU, the secured unfragmented MAC SDUs 604A and 604B are packed separately in the payload 602 of the MAC PDUs 615 and 620 respectively since the secured unfragmented MAC SDUs 604A and 604B are not in sequence although the size of secured unfragmented MAC SDUs 604A and 604B is equal to the negotiated maximum size.

As depicted in FIG. 6D, the unfragmented MAC SDUs 604A and 604B are packed separately in the payload 602 of the MAC PDUs 625 and 630 respectively since the size of unfragmented MAC SDUs 604A and 604B is not equal to the negotiated maximum size although the unfragmented MAC SDUs 604A and 604B are in sequence. Similarly, in case of secured connection where security is applied for each MAC SDU and negotiated maximum size is the maximum size of secured unfragmented MAC SDU, the secured unfragmented MAC SDUs 604A and 604B are packed separately in the payload 602 of the MAC PDUs 625 and 630 respectively since the size of secured unfragmented MAC SDUs 604A and 604B is not equal to the negotiated maximum size although the secured unfragmented MAC SDUs 604A and 604B are in sequence.

Figure 7:
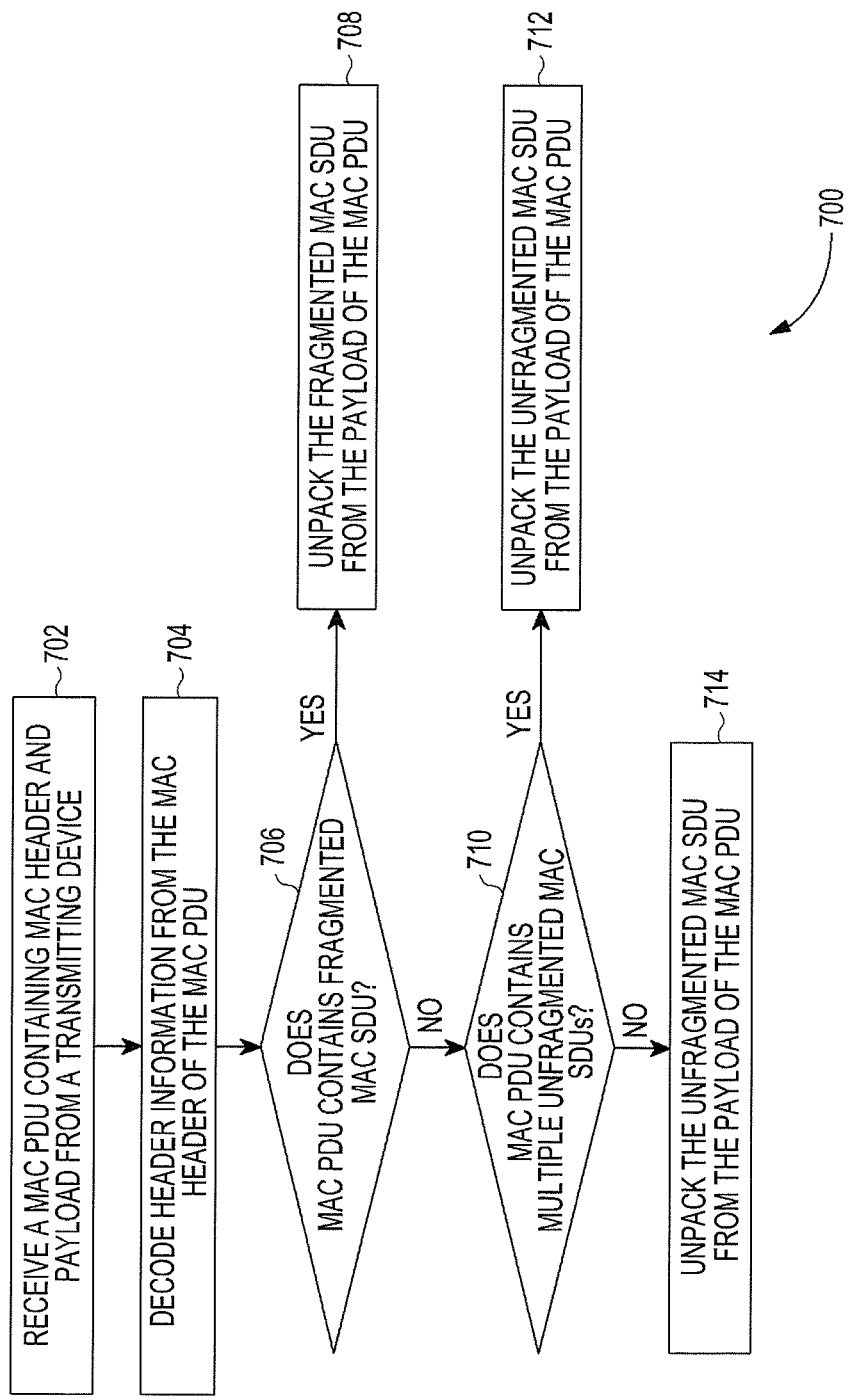
FIG. 7 is a process flowchart illustrating an exemplary method of processing a MAC PDU received from the transmitting device 102, according to one embodiment.

FIG. 7 is a process flowchart 700 illustrating an exemplary method of processing a MAC PDU received from the transmitting device 102, according to one embodiment. At step 702, a MAC PDU containing a MAC header and payload is received from the transmitting device 102. At step 704, header information is decoded from the MAC header of the MAC PDU. For example, the header information includes fragmentation information, size of payload, etc. At step 706, it is determined whether the payload of MAC PDU contains fragmented MAC SDU from fragmented information decoded from the MAC header. In one exemplary implementation, the receiving device 104 determines whether the payload contains fragmented MAC SDU(s) based on the value set in the fragmentation control (FC) field of the MAC header. For example, when the FC field is set to zero, it implies that the payload does not include fragmented MAC SDU. However, when the FC field is set to value 1, then it implies that the payload includes one fragmented MAC SDU. If the MAC PDU contains the fragmented MAC SDU, then at step 708, the fragmented MAC SDU is unpacked from the payload of the MAC PDU.

At step 710, it is determined whether the payload of the MAC PDU contains multiple unfragmented MAC SDUs. In some embodiments, the receiving device 104 determines whether the payload of the MAC PDU contains multiple unfragmented MAC SDUs based on the size of the payload and the negotiated maximum size. For example, if the size of the payload is less than or equal to the negotiated maximum size, then it implies that the payload contains single unfragmented MAC SDU and size of the unfragmented MAC SDU is equal to the payload size. When the security is applied for each MAC PDU and the size of the encrypted payload minus size of security headers/trailers is less than or equal to the negotiated maximum size, then it implies that the payload contains single unfragmented MAC SDU and size of the unfragmented MAC SDU is equal to the size of payload minus size of security headers/trailers. At step 712, the unfragmented MAC SDU is unpacked from the payload of the MAC PDU.

If the size of the payload is greater than the negotiated maximum size, then it implies that the payload contains multiple unfragmented MAC SDUs. In such case, the receiving device 104 determines the number of unfragmented MAC SDUs packed in the payload by dividing the size of the payload by the negotiated maximum size. This is possible since the transmitting device 102 has packed the multiple unfragmented SDUs in the payload whose size is equal to the negotiated maximum size. When the security is applied for each MAC PDU and the size of the encrypted payload minus size of security headers/trailers is greater than the negotiated maximum size, then the receiving device 104 determines the number of unfragmented MAC SDUs packed in the payload through dividing (size of payload minus size of security headers/trailers) by the negotiated maximum size.

At step 714, the unfragmented MAC SDUs having same size are unpacked from the payload of the MAC PDU. One skilled in the art will realize that, the receiving device 104 obtains the unfragmented MAC SDUs in sequence as the transmitting device 102 has packed the unfragmented MAC SDUs having same size in sequence when in sequence delivery is desired, as illustrated in FIG. 5.

Figure 8:
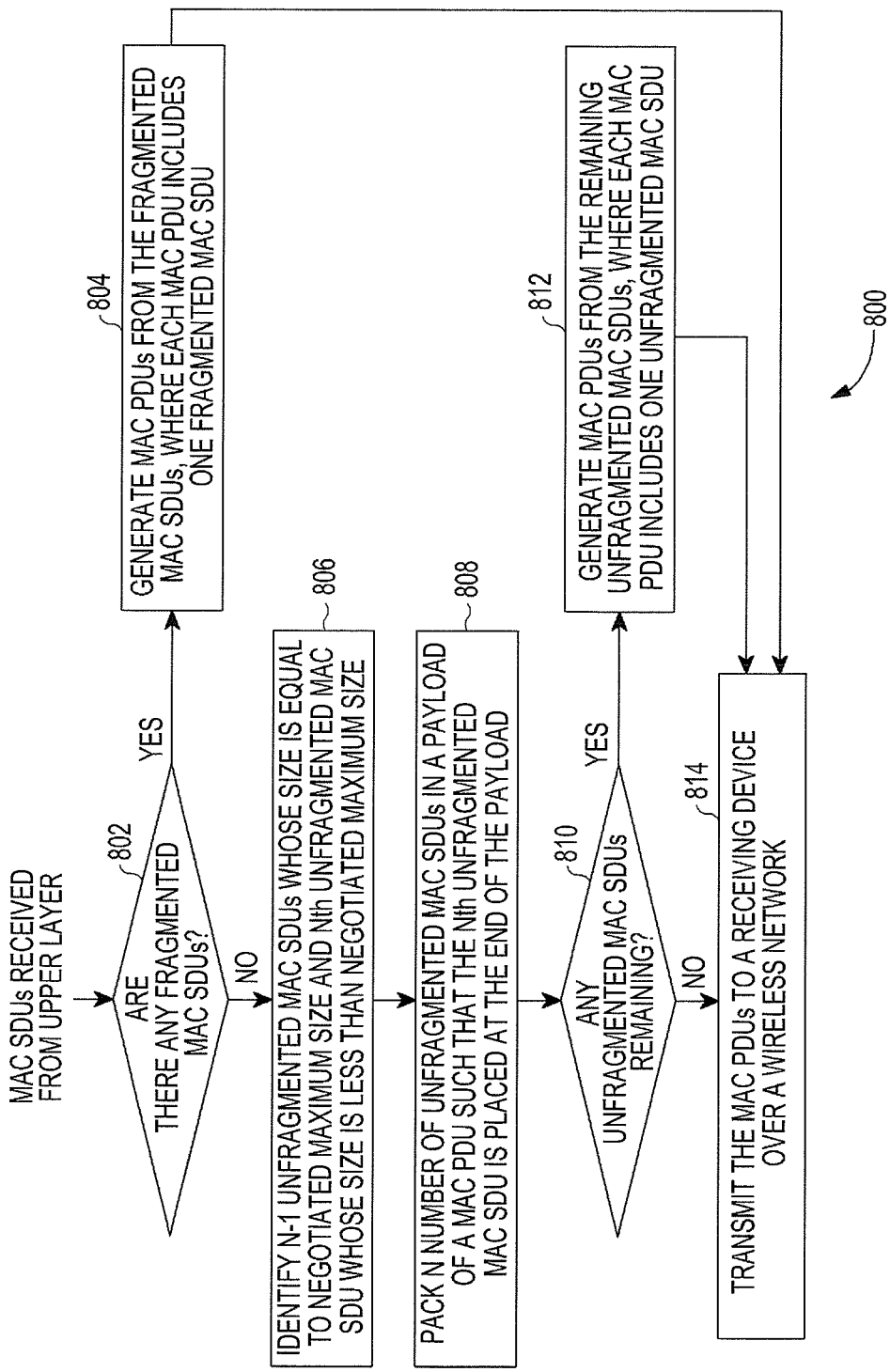
FIG. 8 is a process flowchart of an exemplary method of generating MAC PDU(s) from fragmented/unfragmented MAC SDUs, according to yet another embodiment.

FIG. 8 is a process flowchart 800 of an exemplary method of generating MAC PDU(s) from fragmented/unfragmented MAC SDUs, according to yet another embodiment. At step 802, it is determined whether fragmented MAC SDU(s) exists corresponding to the MAC SDUs received from the upper layer. If the fragmented MAC SDU(s) exists, then at step 804, MAC PDU(s) is generated from the fragmented MAC SDU(s) by packing a single fragmented MAC SDU in a payload of each MAC PDU. If there is more than one fragmented MAC SDU, then multiple MAC PDUs are generated, where each MAC PDU includes one fragmented MAC SDU. At step 814, the MAC PDU(s) is transmitted to the receiving device 104 over the wireless network 110.

If the fragmented MAC SDU(s) does not exists, then at step 806, N−1 number of unfragmented MAC SDUs having size equal to the negotiated maximum size and Nth unfragmented MAC SDU whose size is less than the negotiated maximum size are identified from the MAC SDUs. In case of secured connection where security is applied for each MAC SDU and negotiated maximum size is maximum size of secured unfragmented MAC SDU, N−1 number of secured unfragmented MAC SDUs having size equal to the negotiated maximum size and Nth secured unfragmented MAC SDU whose size is less than the negotiated maximum size are identified from the MAC SDUs, at step 806. At step 808, a MAC PDU is generated from the identified N number of unfragmented MAC SDUs by packing the N number of identified unfragmented MAC SDUs in the payload of the MAC PDU and step 314 is performed. In some embodiments, the N numbers of unfragmented MAC PDUs are packed such that Nth unfragmented MAC SDU is placed at the end of the payload.

At step 810, it is determined whether any unfragmented MAC SDUs are remaining in the MAC SDUs. If one or more unfragmented MAC SDUs are remaining in the MAC SDUs, then at step 812, MAC PDU(s) is generated from the unfragmented MAC SDU(s) by packing, a single unfragmented MAC SDU in a payload of each MAC PDU. If there is more than one unfragmented MAC SDU, then multiple MAC PDUs are generated from the unfragmented MAC SDUs, where each MAC PDU includes one unfragmented MAC SDU. It can be noted that, when the size of unfragmented MAC SDUs is not equal to the negotiated maximum size, each unfragmented MAC SDU is packed in a payload of a separate MAC PDU. At step 814, the MAC PDU(s) is transmitted to the receiving device 104 over the wireless network 110. If there are no unfragmented MAC SDUs remaining in the MAC SDUs, then step 814 is performed.

Figure 9:
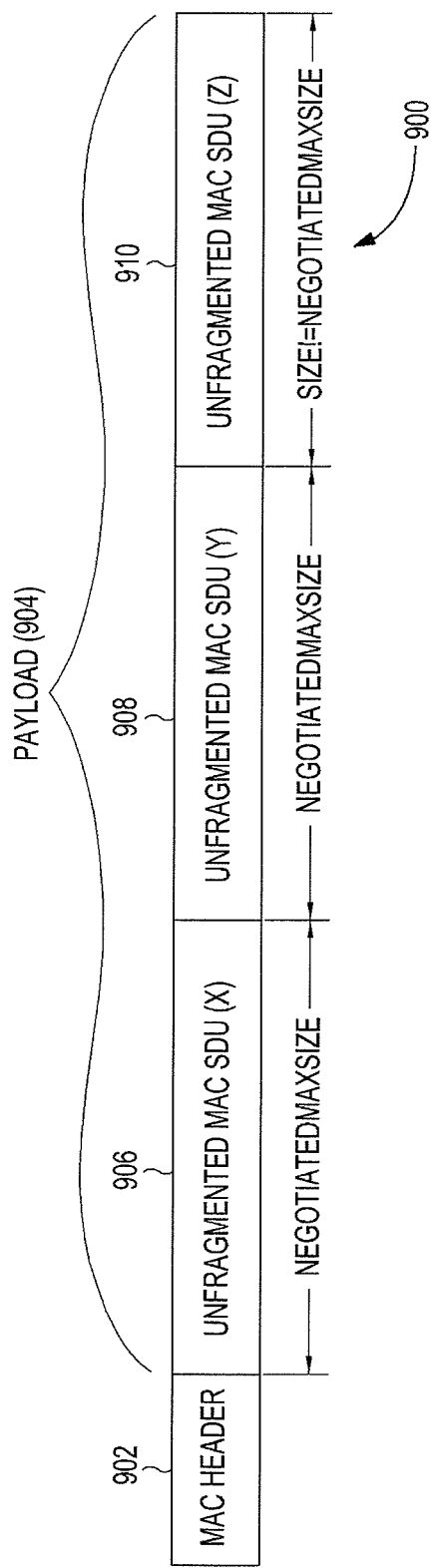
FIG. 9 is a schematic representation illustrating an exemplary MAC PDU, according to yet another embodiment.

FIG. 9 is a schematic representation illustrating an exemplary MAC PDU 900, according to yet another embodiment. The MAC PDU 900 includes a MAC header 902 and a MAC payload 904. As depicted, the payload 904 includes the unfragmented MAC SDUs 906, 908 and 910, where size of the unfragmented MAC SDUs 906 and 908 is equal to the negotiated maximum size and size of the unfragmented MAC SDU 910 is less than the negotiated maximum size. Similarly, for a secured connection where security is applied for each MAC SDU and negotiated maximum size is maximum size of secured unfragmented MAC SDU, the payload 904 includes the secured unfragmented MAC SDUs 906, 908 and 910, where size of the secured unfragmented MAC SDUs 906 and 908 is equal to the negotiated maximum size and size of the secured unfragmented MAC SDU 910 is less than the negotiated maximum size.

Figure 10:
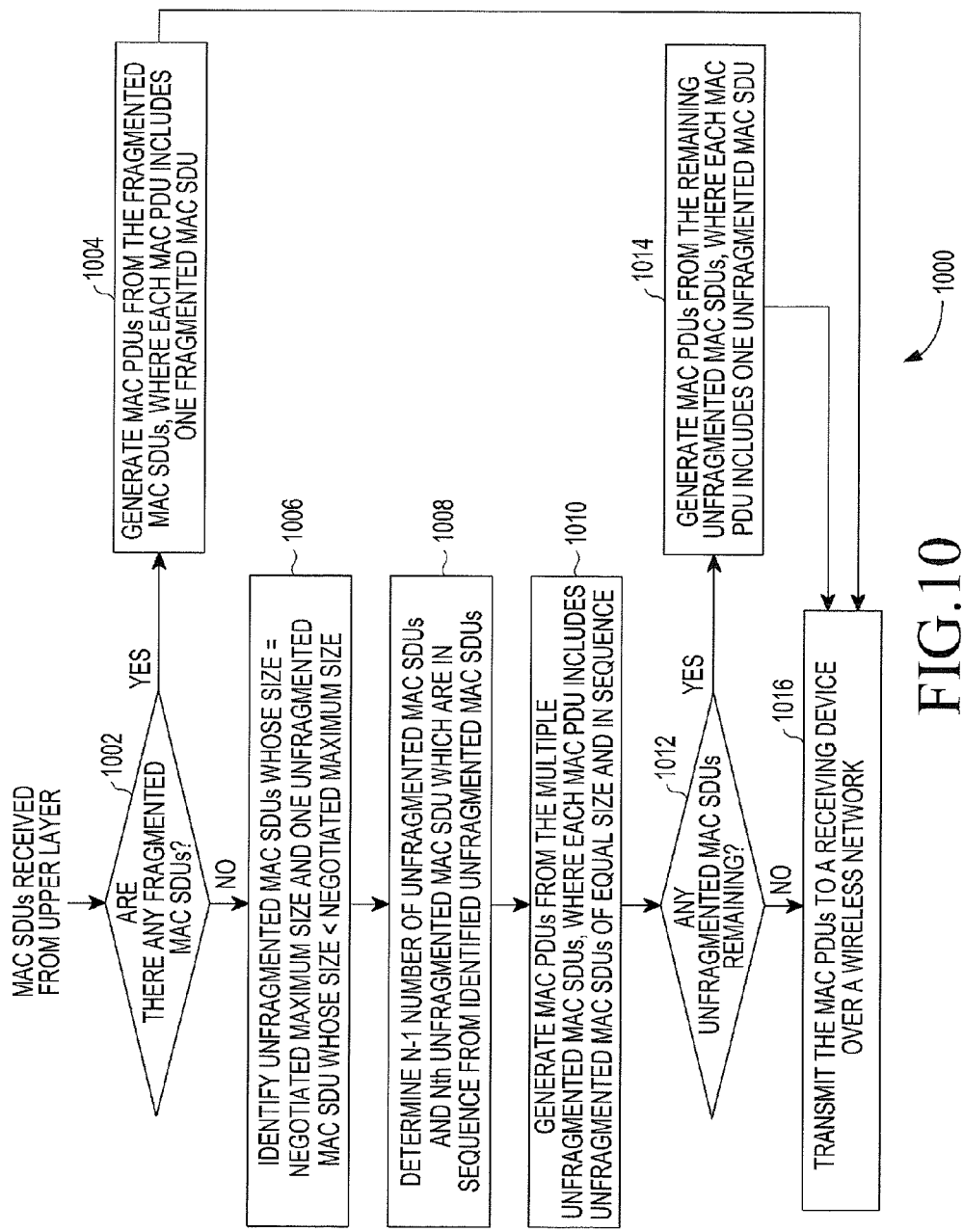
FIG. 10 is a process flowchart illustrating an exemplary method of generating MAC PDU(s) from fragmented/unfragmented MAC SDUs, according to further another embodiment.

FIG. 10 is a process flowchart 1000 illustrating an exemplary method of generating MAC PDU(s) from fragmented/unfragmented MAC SDUs, according to further another embodiment. At step 1002, it is determined whether fragmented MAC SDU(s) exists corresponding to the MAC SDUs received from the upper layer. If the fragmented MAC SDU(s) exists, then at step 1004, MAC PDU(s) is generated from the fragmented MAC SDU(s) by packing a single fragmented MAC SDU in a payload of each MAC PDU. If there is more than one fragmented MAC SDU, then multiple MAC PDUs are generated, where each MAC PDU includes one fragmented MAC SDU. At step 1016, the MAC PDU(s) is transmitted to the receiving device 104 over the wireless network 110.

If the fragmented MAC SDU(s) does not exists, then at step 1006, multiple unfragmented MAC SDUs having size equal to the negotiated maximum size and a single unfragmented MAC SDUs having size less than the negotiated maximum size are identified from the MAC SDUs. For a secured connection where security is applied for each MAC SDU and negotiated maximum size is maximum size of secured unfragmented MAC SDU, multiple secured unfragmented MAC SDUs having size equal to the negotiated maximum size and a single secured unfragmented MAC SDUs having size less than the negotiated maximum size are identified from the MAC SDUs, at step 1006. At step 1008, N number unfragmented MAC SDUs which are in sequence are determined from the identified unfragmented MAC SDUs such that N−1 number of unfragmented MAC SDUs are having size equal to negotiated maximum size and the Nth unfragmented MAC SDUs is having size less than the negotiated maximum size. It is understood that, the step 1008 is performed when in sequence delivery is required at the receiving device 104. At step 1010, a MAC PDU is generated from the unfragmented MAC SDUs which are in sequence by packing the unfragmented MAC SDUs in the payload of the MAC PDU and step 1016 is performed.

At step 1012, it is determined whether any unfragmented MAC SDUs are remaining in the MAC SDUs. If one or more unfragmented MAC SDUs are remaining in the MAC SDUs, then at step 1014, MAC PDU(s) is generated from the unfragmented MAC SDU(s) by packing a single unfragmented MAC SDU in a payload of each MAC PDU. If there is more than one unfragmented MAC SDU, then multiple MAC PDUs are generated from the unfragmented MAC SDUs, where each MAC PDU includes one unfragmented MAC SDU. Thus, when the size of unfragmented MAC SDUs is not equal to the negotiated maximum size, each unfragmented MAC SDU is packed in a payload of a separate MAC PDU. At step 1016, the MAC PDU(s) are transmitted to the receiving device 104 over the wireless network 110. If there are no unfragmented MAC SDUs remaining in the MAC SDUs, then step 1016 is performed.

Figure 11:
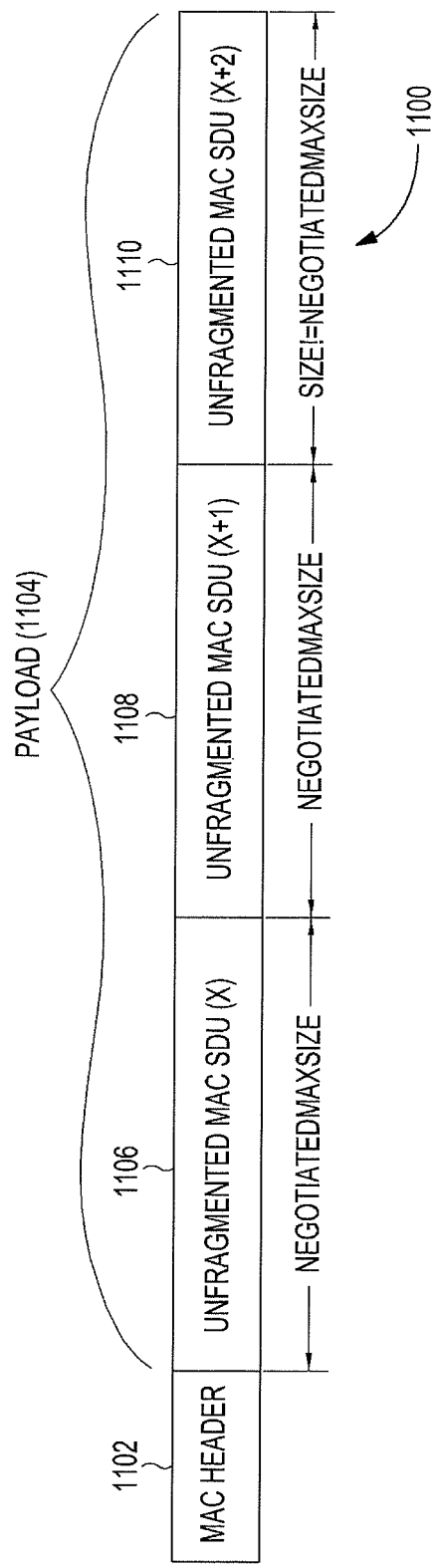
FIG. 11 is a schematic representation illustrating an exemplary MAC PDU, according to further another embodiment.

FIG. 11 is a schematic representation illustrating an exemplary MAC PDU 1100, according to further another embodiment. The MAC PDU 1100 includes a MAC header 1102 and a MAC payload 1104. As depicted, the payload 1104 includes the unfragmented MAC SDUs 1106, 1108 and 1110 where size of the unfragmented MAC SDUs 1106 and 1108 is equal to the negotiated maximum size and size of the unfragmented MAC SDU 1110 is less than the negotiated maximum size and the unfragmented MAC SDUs 1106, 1108, and 1110 are in sequence. Similarly, for a secured connection where security is applied for each MAC SDU and negotiated maximum size is maximum size of secured unfragmented MAC SDU, the payload 1104 includes the secured unfragmented MAC SDUs 1106, 1108 and 1110 where size of the secured unfragmented MAC SDUs 1106 and 1108 is equal to the negotiated maximum size and size of the secured unfragmented MAC SDU 1110 is less than the negotiated maximum size and the secured unfragmented MAC SDUs 1106, 1108, and 1110 are in sequence.

Figure 12:
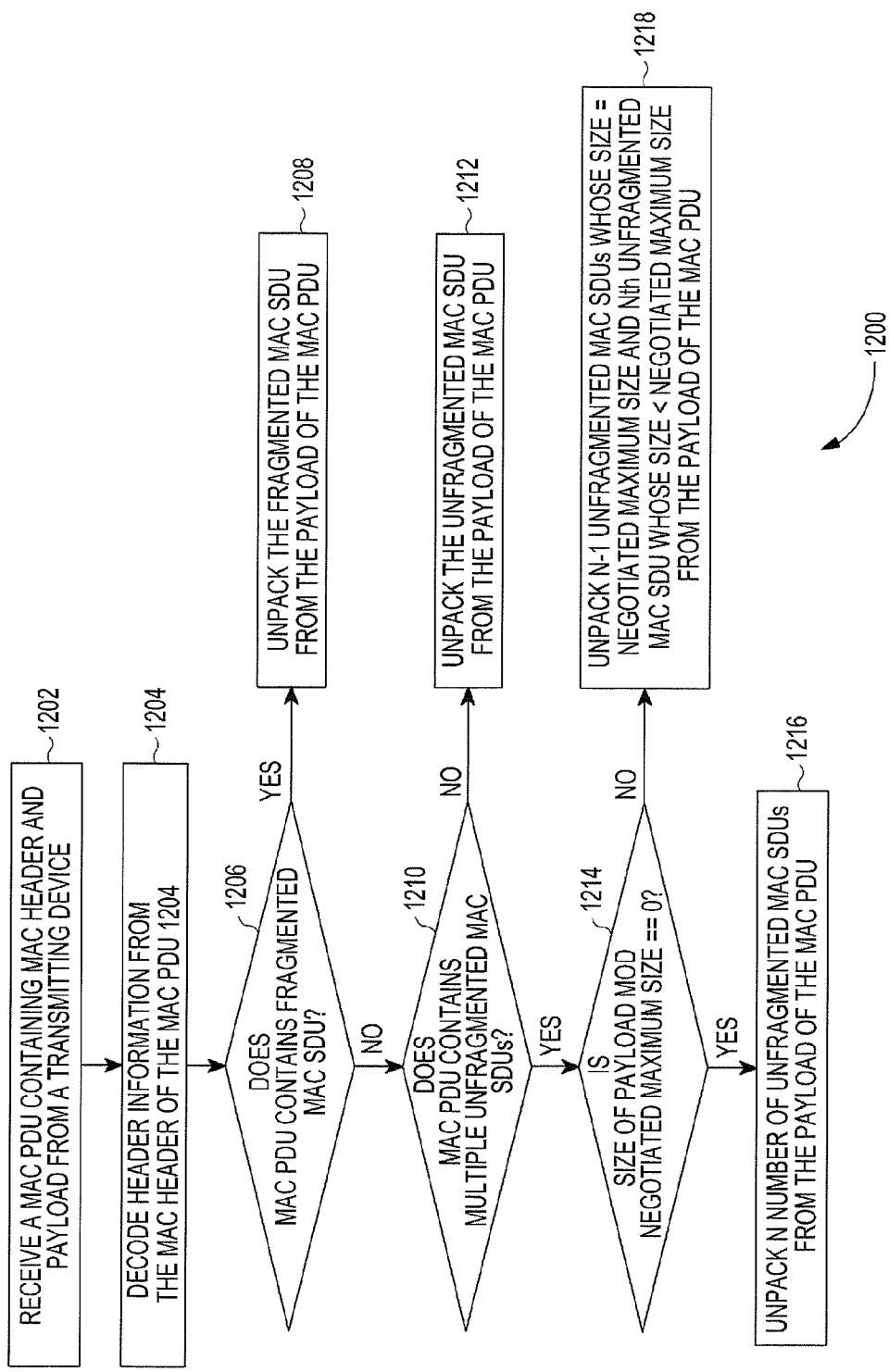
FIG. 12 is a process flowchart illustrating an exemplary method of processing a MAC PDU received from the transmitting device, according to another embodiment.

FIG. 12 is a process flowchart 1200 illustrating an exemplary method of processing a MAC PDU received from the transmitting device 102, according to another embodiment. At step 1202, a MAC PDU containing a MAC header and payload is received from the transmitting device 102. At step 1204, header information is decoded from the MAC header of the MAC PDU. At step 1206, it is determined whether the MAC PDU contains fragmented MAC SDU. If the MAC PDU contains the fragmented MAC SDU, then at step 1208, the fragmented MAC SDU is unpacked from the payload of the MAC PDU.

At step 1210, it is determined whether the payload of the MAC PDU contains multiple unfragmented MAC SDUs. In some embodiments, the receiving device 104 determines whether the payload of the MAC PDU contains multiple unfragmented MAC SDUs based on the size of the payload and the negotiated maximum size. For example, if the size of the payload is less than or equal to the negotiated maximum size, then it implies that the payload contains single unfragmented MAC SDU. When the security is applied for each MAC PDU and the size of the encrypted payload minus size of security headers/trailers is less than or equal to the negotiated maximum size, then it implies that the payload contains single unfragmented MAC SDU and size of the unfragmented MAC SDU is equal to the size of payload minus size of security headers/trailers. At step 1212, the unfragmented MAC SDU is unpacked from the payload of the MAC PDU.

If the size of the payload is greater than the negotiated maximum size, then it implies that the payload contains multiple unfragmented MAC SDUs. At step 1214, it is determined whether the size of payload mod negotiated maximum size is equal to zero. If it is determined that the size of payload mod negotiated maximum size is equal to zero, then it implies that the payload of the MAC PDU contains multiple unfragmented MAC SDUs whose size is equal to the negotiated maximum size. The number of the unfragmented MAC SDUs is equal to the size of the payload divided by the negotiated maximum size. When security function is enabled and security is applied to each MAC PDU, the number of the unfragmented MAC SDUs is equal to (size of the payload minus size of security headers/trailers) divided by the negotiated maximum size. At step 1216, the unfragmented MAC SDUs are unpacked from the payload of the MAC PDU.

If it is determined that the size of payload mod negotiated maximum size is not equal to zero, then it implies that the payload of the MAC PDU contains N number of unfragmented MAC SDUs, whereby the size of N−1 number of unfragmented MAC SDUs is equal to the negotiated maximum size and the size of the Nth unfragmented MAC SDU is less than the negotiated maximum size. In case of unsecured MAC connection, the size of the Nth unfragmented MAC SDU is equal to payload size−((N−1)×negotiated maximum size). In case of secured MAC connection, size of the Nth unfragmented MAC SDU is equal to (payload size−((N−1)× negotiated maximum size) minus size of security headers/ trailers). At step 714, the unfragmented MAC SDUs having, same size are unpacked from the payload of the MAC PDU. One skilled in the art will realize that, the receiving device 104 obtains the unfragmented MAC SDUs in sequence as the transmitting device 102 has packed the unfragmented MAC SDUs having same size in sequence when in sequence delivery is desired, as illustrated in FIG. 5.

Figure 13:
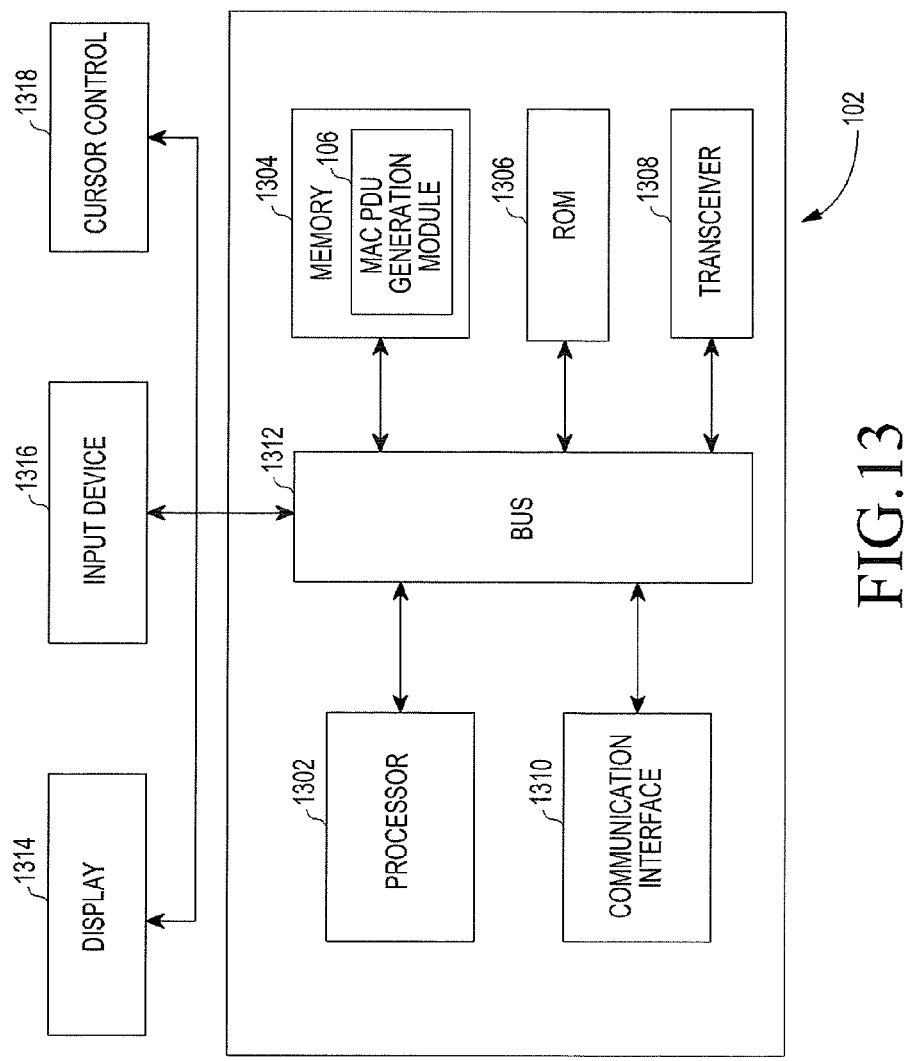
FIG. 13 illustrates a block diagram of a transmitting device showing various components for implementing embodiments of the present subject matter.

FIG. 13 illustrates a block diagram of the transmitting device 102 showing various components for implementing embodiments of the present subject matter. In FIG. 13, the transmitting device 102 includes a processor 1302, memory 1304, a read only memory (ROM) 1306, a transceiver 1308, a communication interface 1310, a bus 1312, a display 1314, an input device 1316, and cursor control 1318.

The processor 1302, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1302 may also include embedded controllers, such as generic or programmable logic devices or arrays, application specific integrated circuits, single-chip computers, smart cards, and the like.

The memory 1304 may be volatile memory and non-volatile memory. The memory 1304 includes a MAC PDU generation module 106 for generating one or more MAC PDUs intended for the receiving device 104 by packing one or more MAC SDUs in payload of the one or more MAC PDUs based on size of MAC PDUs and type of MAC SDUs (e.g., fragmented or unfragmented), according to the embodiments illustrated in FIGS. 1 and 12. A variety of computer-readable storage media may be stored in and accessed from the memory elements. Memory elements may include any suitable memory device(s) for storing data and machine-readable instructions such as read only memory, random access memory, erasable programmable read only memory, electrically erasable programmable read only memory, hard drive, removable media drive for handling memory cards, Memory Sticks™, and the like.

Embodiments of the present subject matter may be implemented in conjunction with modules including functions, procedures, data structures, and application programs, for performing tasks, defining abstract data types, or low-level hardware contexts. The MAC PDU generation module 106 may be stored in the form of machine-readable instructions on any of the above-mentioned storage media which is then executed by the processor 1302. For example, a computer program may include machine-readable instructions capable of generating one or more MAC PDUs intended for the receiving device 104 by packing one or more MAC SDUs in payload of the one or more MAC PDUs based on size of MAC PDUs and type of MAC SDUs (e.g., fragmented or unfragmented), according to the teachings and herein described embodiments of the present subject matter. The computer program may be included on a storage medium and loaded from the storage medium to a hard drive in the non-volatile memory. Moreover, the transceiver 1308 is configured for transmitting the one or more MAC PDUs to the receiving device 104 over the wireless network 110. The components such as the ROM 1306, the communication interface 1310, the bus 1312, the display 1314, the input device 1316, and the cursor control 1318 are well known to the person skilled in the art and hence the explanation is thereof omitted.

Figure 14:
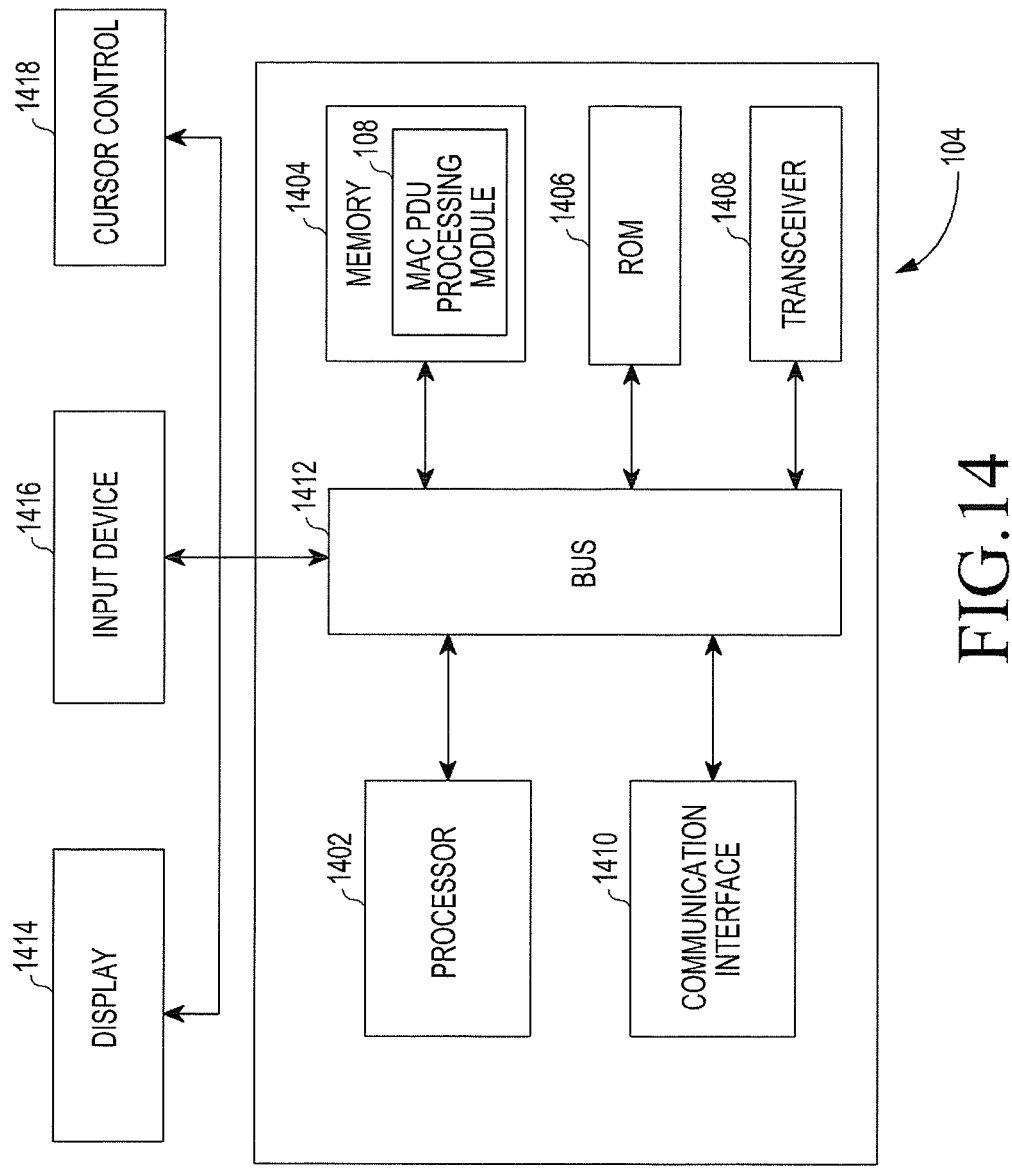
FIG. 14 illustrates a block diagram of a receiving device showing various components for implementing embodiments of the present subject matter.

FIG. 14 illustrates a block diagram of the receiving device 104 showing various components for implementing embodiments of the present subject matter. In FIG. 14, the receiving device 104 includes a processor 1402, memory 1404, a read only memory (ROM) 1406, a transceiver 1408, a communication interface 1410, a bus 1412, a display 1414, an input device 1416, and cursor control 1418.

The processor 1402, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1402 may also include embedded controllers, such as generic or programmable logic devices or arrays, application specific integrated circuits, single-chip computers, smart cards, and the like.

The memory 1404 may be volatile memory and non-volatile memory. The memory 1404 includes a MAC PDU processing module 108 for processing one or more MAC PDUs received from the transmitting, device 102 based on information (e.g., negotiated maximum size, size of payload, fragmentation information) encoded in the MAC header of the one or more MAC PDUs, according to the embodiments illustrated in FIGS. 1 and 12. A variety of computer-readable storage media may be stored in and accessed from the memory elements. Memory elements may include any suitable memory device(s) for storing data and machine-readable instructions such as read only memory, random access memory, erasable programmable read only memory, electrically erasable programmable read only memory, hard drive, removable media drive for handling memory cards, Memory Sticks™, and the like.

Embodiments of the present subject matter may be implemented in conjunction with modules including functions, procedures, data structures, and application programs, for performing tasks, defining abstract data types, or low-level hardware contexts. The MAC PDU processing module 108 may be stored in the form of machine-readable instructions on any of the above-mentioned storage media which is then executed by the processor 1402. For example, a computer program may include machine-readable instructions capable of processing one or more MAC PDUs received from the transmitting device 102 based on information (e.g., negotiated maximum size, size of payload, fragmentation information) encoded in the MAC header of the MAC PDUs, according to the teachings and herein described embodiments of the present subject matter. The computer program may be included on a storage medium and loaded from the storage medium to a hard drive in the non-volatile memory. Moreover, the transceiver 1408 is configured for receiving the one or more MAC PDUs from the transmitting device 102 over the wireless network 110. The components such as the ROM 1406, the communication interface 1410, the bus 1412, the display 1414, the input device 1416, and the cursor control 1418 are well known to the person skilled in the art and hence the explanation is thereof omitted.

In various embodiments, the methods and system described in FIGS. 1 through 14 reduces time required for generating MAC PDUs at the transmitting device 102 and for processing the MAC PDUs at the receiving device 104. Also, in the present invention, no variable sized headers (e.g., packet extension header) are added in the MAC PDUs generated by the transmitting device 102 to support packing of MAC SDUs.

The present embodiments have been described with reference to specific example embodiments, it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method of a transmitting device for generating medium access control (MAC) protocol data units (PDUs) from MAC service data units (SDUs), comprising:
    determining whether a plurality of variable size MAC SDUs intended for a receiving device comprise one or more fragmented MAC SDUs;
    if the plurality of variable size MAC SDUs comprise the one or more fragmented MAC SDUs, generating one or more MAC PDUs from the one or more fragmented MAC SDUs, wherein each of the one or more MAC PDUs comprises a single fragmented MAC SDU;
    if the plurality of variable size MAC SDUs do not comprise the one or more fragmented MAC SDUs, determining whether variable size unfragmented MAC SDUs in the plurality of MAC SDUs satisfy pre-defined criteria;
    if the variable size unfragmented MAC SDUs in the plurality of MAC SDUs satisfies the pre-defined criteria, generating one or more MAC PDUs from the one or more unfragmented MAC SDUs, wherein each of the one or more MAC PDUs comprises multiple unfragmented MAC SDUs; and
    if the variable size unfragmented MAC SDUs in the plurality of MAC SDUs do not satisfy the pre-defined criteria, generating one or more MAC PDUs from the one or more unfragmented MAC SDUs, wherein each of the one or more MAC PDUs comprises a single unfragmented MAC SDU,
    wherein the pre-defined criteria comprises a negotiated maximum size, and
    wherein the negotiated maximum size indicates a size of a MAC SDU that a MAC layer can receive from an upper protocol for transmitting the MAC SDU on a MAC layer connection when a security function is enabled, or a maximum size of the MAC SDU that the MAC layer can receive from an upper protocol for transmitting the MAC SDU on the MAC layer connection.

2. The method of claim 1, further comprising:
    transmitting the one or more MAC PDUs to the receiving device over a wireless network.

3. The method of claim 1, wherein in determining whether the plurality of MAC SDUs intended for the receiver device comprise said one or more fragmented MAC SDUs, the plurality of MAC SDUs comprise at least one of fragmented MAC SDUs and unfragmented MAC SDUs.

4. The method of claim 1, wherein the pre-defined criteria comprises sequence of one or more unfragmented MAC SDUs.

5. The method of claim 4, wherein determining whether the unfragmented MAC SDUs in the plurality of variable size MAC SDUs satisfy the pre-defined criteria comprises:
    identifying the unfragmented MAC SDUs from the plurality of variable size MAC SDUs whose size are equal to the negotiated maximum size.

6. The method of claim 5, wherein generating the one or more MAC PDUs from the one or more unfragmented MAC SDUs comprises:
    packing the unfragmented MAC SDUs having size equal to the negotiated maximum size in a payload of a MAC PDU.

7. The method of claim 4, wherein determining whether the two or more unfragmented MAC SDUs in the plurality of variable size MAC SDUs satisfy the pre-defined criteria comprises:
    identifying the unfragmented MAC SDUs from the plurality of variable size MAC SDUs whose size are equal to the negotiated maximum size; and
    determining the identified unfragmented MAC SDUs which are in sequence.

8. The method of claim 7, wherein generating the MAC PDU from the two or more identified unfragmented MAC SDUs comprises:
    packing the unfragmented MAC SDUs having size equal to the negotiated maximum size and in sequence in a payload of a MAC PDU.

9. The method of claim 4, wherein determining whether the two or more unfragmented MAC SDUs in the plurality of variable size MAC SDUs satisfy the pre-defined criteria comprises:
    identifying N-1 number of unfragmented MAC SDUs whose size are equal to the negotiated maximum size and Nth number of unfragmented MAC SDU whose size is less than the negotiated maximum size, wherein N is an integer greater than 1.

10. The method of claim 9, wherein generating the MAC PDU from the two or more identified unfragmented MAC SDUs comprises:
packing the N number of the unfragmented MAC SDUs in a payload of a MAC PDU such that the Nth number of unfragmented MAC SDU whose size is less than the negotiated maximum size is placed at the end of the payload.

11. The method of claim 4, wherein determining whether the two or more unfragmented MAC SDUs in the plurality of variable size MAC SDUs satisfy the pre-defined criteria comprises:
identifying multiple unfragmented MAC SDUs whose size are equal to the negotiated maximum size and one unfragmented MAC SDU whose size is less than the negotiated maximum size; and
identifying N number of unfragmented MAC SDUs that are in sequence from the multiple unfragmented MAC SDUs, wherein the N-1 number of unfragmented MAC SDUs are having size equal to the negotiated maximum size and Nth number of unfragmented MAC SDU is having size less than the negotiated maximum size wherein N is an integer greater than 1.

12. The method of claim 11, wherein generating the MAC PDU from the two or more identified unfragmented MAC SDUs comprises:
packing the N number of the unfragmented MAC SDUs in a payload of a MAC PDU such that the Nth number of unfragmented MAC SDU whose size is less than the negotiated maximum size is placed at the end of the payload.

13. The method of claim 1, wherein the maximum size of MAC SDU is equal to the negotiated maximum size minus size of security headers/trailers.

14. The method of claim 1, wherein the negotiated maximum size is constant for every MAC layer connection.

15. The method of claim 1, wherein the negotiated maximum size is a specific value for each MAC layer connection and independently negotiated between the transmitting device and the receiving device.

16. An apparatus comprising:
a processor; and
memory coupled to the processor, wherein the memory includes a medium access control (MAC) protocol data unit (PDU) generation module configured for:
determining whether a plurality of variable size MAC service data units (SDUs) intended for a receiving device includes one or more fragmented MAC SDUs;
if the plurality of variable size MAC SDUs comprises the one or more fragmented MAC SDUs, generating one or more MAC PDUs from the one or more fragmented MAC SDUs, wherein each of the one or more MAC PDUs comprises a single fragmented MAC SDU;
if the plurality of variable size MAC SDUs do not comprise the one or more fragmented MAC SDUs, determining whether variable size unfragmented MAC SDUs in the plurality of MAC SDUs satisfy pre-defined criteria;
if the variable size unfragmented MAC SDUs in the plurality of MAC SDUs satisfy pre-defined criteria, generating one or more MAC PDUs from the one or more unfragmented MAC SDUs, wherein each of the one or more MAC PDUs comprises multiple unfragmented MAC SDUs; and
if the variable size unfragmented MAC SDUs in the plurality of MAC SDUs do not satisfy pre-defined criteria, generating one or more MAC PDUs from the one or more unfragmented MAC SDUs, wherein each of the one or more MAC PDUs comprises a single unfragmented MAC SDU,
wherein the pre-defined criteria comprises a negotiated maximum size, and
wherein the negotiated maximum size indicates a size of a MAC SDU that a MAC layer can receive from an upper protocol for transmitting the MAC SDU on a MAC layer connection when a security function is enabled, or a maximum size of the MAC SDU that the MAC layer can receive from an upper protocol for transmitting the MAC SDU on the MAC layer connection.

17. The apparatus of claim 16, further comprising a transceiver configured for transmitting the one or more MAC PDUs to the receiving device over a wireless network.

18. The apparatus of claim 16, wherein the plurality of MAC SDUs comprise at least one of fragmented MAC SDUs and unfragmented MAC SDUs.

19. The apparatus of claim 16, wherein the pre-defined criteria comprises sequence of one or more unfragmented MAC SDUs.

20. The apparatus of claim 16, wherein the maximum size of MAC SDU is equal to the negotiated maximum size minus size of security headers/trailers.

21. The apparatus of claim 16, wherein the negotiated maximum size is constant for every MAC layer connection.

22. The apparatus of claim 16, wherein the negotiated maximum size is a specific value for each MAC layer connection and independently negotiated with the receiving device.

23. A method of processing a medium access control (MAC) protocol data units (PDUs) comprising:
receiving a MAC PDU containing a MAC header and a payload from a transmitting device over a wireless network;
determining whether the payload of the MAC PDU contains a fragmented MAC service data unit (SDU) using fragmentation information in the MAC header of the MAC PDU;
if the payload of the MAC PDU contains the fragmented MAC SDU, unpacking the fragmented MAC SDU from the payload of the MAC PDU;
if the payload of the MAC PDU does not contain the fragmented MAC SDU, determining whether the payload of the MAC PDU contains multiple unfragmented MAC SDUs based on a negotiated maximum size;
if the payload of the MAC PDU contains multiple unfragmented MAC SDUs, unpacking the multiple unfragmented MAC SDUs from the payload of the MAC PDU; and
if the payload of the MAC PDU does not contain multiple unfragmented MAC SDUs, unpacking an unfragmented MAC SDU from the payload of the MAC PDU,
wherein the negotiated maximum size indicates size of a MAC SDU that a MAC layer can receive from an upper protocol for transmitting the MAC SDU on a MAC layer connection when a security function is enabled, or a maximum size of the MAC SDU that the MAC layer can receive from an upper protocol for transmitting the MAC SDU on the MAC layer connection.

24. The method of claim 23, wherein determining whether the payload of the MAC PDU contains the multiple unfragmented MAC SDUs using the size information in the MAC header of the MAC PDU comprises:
   determining number of unfragmented MAC SDUs in the MAC PDU and size of each of the unfragmented MAC SDUs based on size of the payload in the MAC PDU and the negotiated maximum size.

25. The method of claim 23, wherein determining the number of unfragmented MAC SDUs in the payload of the MAC PDU and the size of each of the unfragmented MAC SDUs comprises:
   determining whether the size of the payload in the MAC PDU is less than or equal to the negotiated maximum size;
   if the size of the payload in the MAC PDU is less than or equal to the negotiated maximum size, unpacking an unfragmented MAC SDU from the payload of the MAC PDU; and
   if the size of the payload in the MAC PDU is greater than the negotiated maximum size, unpacking N number of unfragmented MAC SDUs from the payload of the MAC PDU, wherein the value of N is equal to size of the payload in the MAC PDU divided by the negotiated maximum size, and wherein the size of each of the unfragmented MAC SDUs is equal to the negotiated maximum size.

26. The method of claim 23, wherein determining the number of unfragmented MAC SDUs in the payload of the MAC PDU and the size of each of the unfragmented MAC SDUs comprises:
   determining whether the size of the payload in the encrypted MAC PDU minus size of security headers/trailers is less than or equal to the negotiated maximum size;
   if the size of the payload in the encrypted MAC PDU minus the size of the security headers/trailers is less than or equal to the negotiated maximum size, unpacking an unfragmented MAC SDU from the payload of the MAC PDU, wherein the size of unfragmented MAC SDU is equal to the size of the payload minus size of security headers/trailers; and
   if the size of the payload in the encrypted MAC PDU minus the size of the security headers/trailers is greater than the negotiated maximum size, unpacking N number of unfragmented MAC SDUs from the payload of the MAC PDU, wherein the value of N is equal to (size of payload minus size of security headers/trailers) divided by the negotiated maximum size, and wherein the size of each of the unfragmented MAC SDUs is equal to the negotiated maximum size.

27. The method of claim 23, wherein determining the number of unfragmented MAC SDUs in the MAC PDU and the size of each of the unfragmented MAC SDUs comprises:
   determining whether the size of the payload in the MAC PDU is less than or equal to the negotiated maximum size;
   if the size of the payload in the MAC PDU is less than or equal to the negotiated maximum size, unpacking an unfragmented MAC SDU from the payload of the MAC PDU; and
   if the size of the payload in the MAC PDU is greater than the negotiated maximum size, unpacking N+1 number of unfragmented MAC SDUs from the payload of the MAC PDU, wherein the value of N is equal to size of the payload in the MAC PDU divided by the negotiated maximum size, and wherein the size of first N unfragmented MAC SDUs is equal to the negotiated maximum size and wherein the size of last unfragmented MAC SDU is equal to the size of the payload minus N times negotiated maximum size.

28. The method of claim 23, wherein determining the number of unfragmented MAC SDUs in the MAC PDU and the size of each of the unfragmented MAC SDUs comprises:
   determining whether the size of the payload in the encrypted MAC PDU minus size of security headers/trailers is less than or equal to the negotiated maximum size;
   if the size of the payload in the encrypted MAC PDU minus the size of the security headers/trailers is less than or equal to the negotiated maximum size, unpacking an unfragmented MAC SDU from the payload of the MAC PDU, wherein the size of unfragmented MAC SDU is equal to the size of the payload minus size of security headers/trailers; and
   if the size of the payload in the encrypted MAC PDU minus the size of the security headers/trailers is greater than the negotiated maximum size, unpacking N+1 number of unfragmented MAC SDUs from the payload of the MAC PDU, wherein the value of N is equal to (size of the payload minus size of security headers/trailers) divided by the negotiated maximum size, and wherein the size of first N unfragmented MAC SDUs is equal to the negotiated maximum size and wherein the size of last unfragmented MAC SDU is equal to (size of the payload minus N times negotiated maximum size minus size of security headers/trailers.

29. An apparatus comprising:
   a transceiver configured for receiving a medium access control (MAC) protocol data unit (PDU) containing a MAC header and a payload from a transmitting device over a wireless network;
   a processor coupled to the transceiver; and
   memory coupled to the processor, wherein the memory comprises a MAC PDU processing module configured for:
   determining whether the payload of the MAC PDU contains a fragmented MAC service data unit (SDU) using fragmentation information in the MAC header of the MAC PDU;
   if the payload of the MAC PDU contains the fragmented MAC SDU, unpacking the fragmented MAC SDU from the payload of the MAC PDU;
   if the payload of the MAC PDU does not contain the fragmented MAC SDU, determining whether the payload of the MAC PDU contains multiple unfragmented MAC SDUs based on a negotiated maximum size;
   if the payload of the MAC PDU contains multiple unfragmented MAC SDUs, unpacking the multiple unfragmented MAC SDUs from the payload of the MAC PDU; and
   if the payload of the MAC PDU does not contain multiple unfragmented MAC SDUs, unpacking an unfragmented MAC SDU from the payload of the MAC PDU,
   wherein the negotiated maximum size indicates a size of a MAC SDU that a MAC layer can receive from an upper protocol for transmitting the MAC SDU on a MAC layer connection when a security function is enabled, or a maximum size of the MAC SDU that the MAC layer can receive from an upper protocol for transmitting the MAC SDU on the MAC layer connection.

* * * * *